No. 882,657. PATENTED MAR. 24, 1908.
W. E. TREDWAY.
ATTACHMENT FOR INCUBATORS AND BROODERS.
APPLICATION FILED OCT. 19, 1907.

William E. Tredway,
Inventor

Witnesses
By C. A. Snow & Co.
Attorneys

UNITED STATES PATENT OFFICE.

WILLIAM E. TREDWAY, OF BLACKWELL, OKLAHOMA.

ATTACHMENT FOR INCUBATORS AND BROODERS.

No. 882,657.  Specification of Letters Patent.  Patented March 24, 1908.

Application filed October 19, 1907. Serial No. 398,227.

*To all whom it may concern:*

Be it known that I, WILLIAM E. TREDWAY, a citizen of the United States, residing at Blackwell, in the county of Kay and State of Oklahoma, have invented a new and useful Attachment for Incubators and Brooders, of which the following is a specification.

This invention relates to attachments for incubators, brooders, etc., and its object is to provide a device of novel form designed to be interposed between the heat compartment and the compartment containing the eggs or chicks, said means serving to efficiently distribute the heat.

Another object is to provide an attachment of this character utilizing feathers for the purpose of distributing the heat, said feathers being designed to contact with the eggs when used within an incubator. It also constitutes a soft covering for chicks in ordinary brooders.

Another object is to provide simple and efficient means for attaching the feathers to the body of the device so that the same will be securely held in position.

With these and other objects in view the invention consists of certain novel features of construction and combinations of parts which will be hereinafter more fully described and pointed out in the claims.

In the accompanying drawings is shown the preferred form of the invention.

Figure 1:
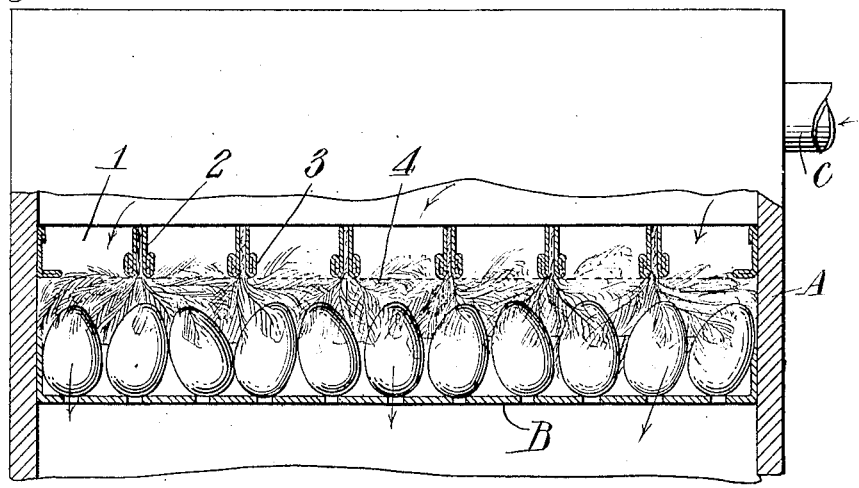
Figure 2:
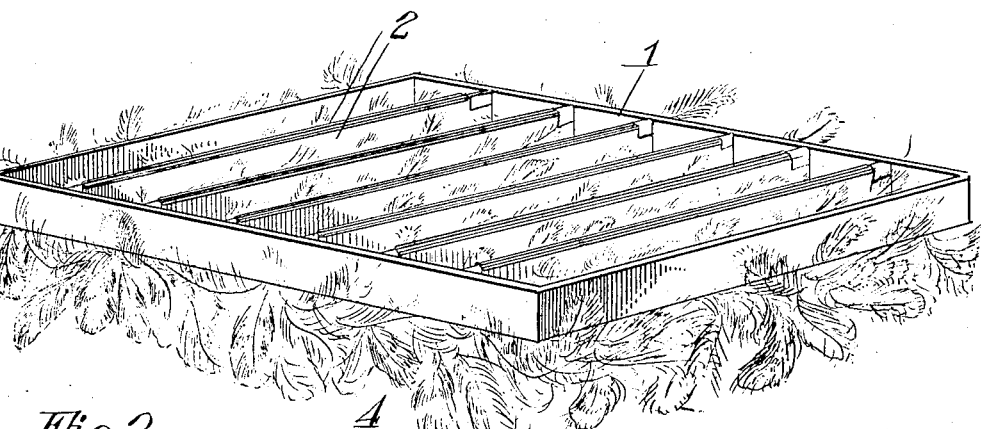

In said drawings: Figure 1 is a section through a portion of an incubator and showing the improved attachment in position therein. Fig. 2 is a perspective view of the attachment.

Referring to the figures by characters of reference, 1 designates a frame preferably formed of metal and provided with a plurality of cross strips 2 arranged in pairs and secured to opposite portions of the frame in any preferred manner as by means of solder. The lower edges of the cross strips are preferably folded to form beads 3 and clamped between the cross strips of each pair are feathers such as indicated at 4, the tops of which project beyond the frame and cross strips and form a soft mass which closes the spaces between the cross strips and extends beyond the frame so as to present a soft yielding surface which will not injure eggs upon which the device is placed.

In using the device the same is placed within the incubator which has been indicated by the letter A and between the tray B and the pipe C which conducts the heat to the incubator. The features constituting the bottom portion of the attachment are designed to contact with the eggs contained within the tray and as the heat passes downward from the upper portion of the incubator as indicated by the arrows in Fig. 1 it will be evenly distributed by the feathers and said feathers will prevent the heated air from coming directly into contact with the eggs and will act as a shield.

The device can be used in various forms of incubators and can also be used in brooders to shield the young chicks from the direct action of the heat and to also constitute a soft surface against which they can nestle.

Although the device has been described as constructed of metal it is to be understood that the same can be made up partly or entirely of wood or cardboard.

What is claimed is:

1. An attachment of the character described comprising a frame, cross strips secured therein and arranged in pairs to constitute holding members, and feathers secured between and extending beyond the holding members.

2. An attachment for incubators and the like comprising a frame, cross strips secured therein and arranged in pairs to constitute holding members, and separated fibrous material secured between and extending beyond the holding members.

3. An attachment for incubators and the like comprising a frame, coöperating holding members arranged in rows, and separated fibrous material held and supported between and extending beyond said members and constituting a continuous mass extending over and concealing one face of the frame.

4. The combination with a structure having an upper head compartment and a lower compartment; of a frame interposed between said compartments, coöperating holding members arranged in rows, and separated fibrous material held and supported between and extending beyond said members, said material constituting a continuous mass concealing one face of the frame and forming a shield for the contents of the lower compartment.

In testimony that I claim the foregoing as my own, I have hereto affixed my signature in the presence of two witnesses.

WILLIAM E. TREDWAY.

Witnesses:
JOHN S. BURGER,
CASS T. LOCKWOOD.